(12) United States Patent
Jiang et al.

(10) Patent No.: US 11,744,401 B2
(45) Date of Patent: Sep. 5, 2023

(54) INTEGRATED AUTOMATIC SEA CUCUMBER COOKING AND SOAKING SYSTEM

(71) Applicant: Dalian Polytechnic University, Dalian (CN)

(72) Inventors: Pengfei Jiang, Dalian (CN); Xiuping Dong, Dalian (CN); Hang Qi, Dalian (CN); Ming Du, Dalian (CN); Mingqian Tan, Dalian (CN); Huihui Wang, Dalian (CN); Liang Song, Dalian (CN); Jie Zheng, Dalian (CN); Yuxin Liu, Dalian (CN); Kaiyue Zhu, Dalian (CN); Qingguo Meng, Dalian (CN); Beiwei Zhu, Dalian (CN)

(73) Assignee: DALIAN POLYTECHNIC UNIVERSITY, Dalian (CN)

( * ) Notice: Subject to any disclaimer, the term of this patent is extended or adjusted under 35 U.S.C. 154(b) by 70 days.

(21) Appl. No.: 17/881,681

(22) Filed: Aug. 5, 2022

(65) Prior Publication Data
US 2022/0369858 A1 Nov. 24, 2022

(30) Foreign Application Priority Data
Aug. 11, 2021 (CN) .......................... 202121864174.4

(51) Int. Cl.
*A47J 36/32* (2006.01)
*A47J 27/10* (2006.01)
(52) U.S. Cl.
CPC .............. *A47J 36/32* (2013.01); *A47J 27/10* (2013.01)
(58) Field of Classification Search
CPC ............ A47J 27/10; A47J 36/32; A47J 27/18; A47J 39/006; A47J 44/00; A23L 5/13; F25D 17/02; F25D 23/12; F25D 31/005
(Continued)

(56) References Cited

U.S. PATENT DOCUMENTS

| 3,958,503 A * | 5/1976 | Moore ..................... A47J 27/18 99/356 |
| 10,798,953 B2 * | 10/2020 | Liss ........................ A47J 36/32 |
| 2021/0076861 A1 * | 3/2021 | Pearson ................ A47J 27/024 |

(Continued)

*Primary Examiner* — Dana Ross
*Assistant Examiner* — James F Sims, III
(74) *Attorney, Agent, or Firm* — IPro, PLLC; Na Xu (57) ABSTRACT

The disclosure discloses an integrated automatic sea cucumber cooking and soaking system, which belongs to the technical field of sea cucumber processing. The system includes a cabinet body for holding sea cucumbers; the cabinet body is communicated with an external circulating cooling and filtering system and a cold and hot pipe system; the external circulating cooling and filtering system is used for providing cooled filtered circulating water for the cabinet body; the cold and hot pipe system can be used for increasing or decreasing temperature of circulating water in the cabinet body; a top of the cabinet body is provided with a weighing device; the weighing device is connected, through a tension column, to a weighing bracket arranged in the cabinet body; a plurality of groups of supporting holders are arranged on the weighing bracket along a vertical direction; a slotted hole drawer for holding sea cucumbers is arranged on each group of the supporting holder in a supported manner; and the circulating water in the cabinet body is subjected to internal circulation through an internal circulating pipeline arranged outside. According to the disclosure, sea cucumber cooking and soaking processes can be integrated; the cooking and soaking efficiency can be improved; and waste of water is reduced.

7 Claims, 6 Drawing Sheets

(58) Field of Classification Search
USPC .......................................................... 99/331
See application file for complete search history.

(56) References Cited

U.S. PATENT DOCUMENTS

2021/0076862 A1* 3/2021 Gardner .................. F25D 17/04
2021/0235915 A1* 8/2021 Chang ................ A47J 27/21166

* cited by examiner

INTEGRATED AUTOMATIC SEA CUCUMBER COOKING AND SOAKING SYSTEM

TECHNICAL FIELD

The disclosure relates to an integrated automatic sea cucumber cooking and soaking system, and belongs to the technical field of sea cucumber processing.

BACKGROUND

During cooking of sea cucumbers, sea cucumbers need to be put into water with high temperature for cooking. After the cooking of the sea cucumbers is completed, the sea cucumbers enter a soaking process. In this process, the sea cucumbers need to be soaked in water with low temperature for multiple times. After the soaking is completed, the sea cucumbers also need to be weighed to determine whether the sea cucumbers are completely soaked.

Whether it is in the cooking process or the soaking process of the sea cucumbers, in a traditional technology, processes of soaking, temperature control, water changing, and weighing and the like are generally manually performed step by step, resulting in low efficiency and a large waste of water.

SUMMARY

In order to solve the problems of low efficiency and waste of water resources in a current sea cucumber cooking process, the disclosure provides an integrated automatic sea cucumber cooking and soaking system. The system includes a cabinet body 3 for holding sea cucumbers; an external circulating water inlet 36 and a cold and hot pipe outlet 34 are formed in a top of the cabinet body 3; an external circulating water outlet 31 and a cold and hot pipe inlet 39 are formed in a bottom side wall of the cabinet body 3; and both the external circulating water inlet 36 and the external circulating water outlet 31 are provided with a valve.

The external circulating water outlet 31 is communicated to a water inlet of a first water storage tank 6; and a water outlet of the first water storage tank 6 is communicated to an inlet of a main filter 1 through a first filter 7, a first pump body 8, a first throttling valve 11 and a check valve successively.

An outlet of the main filter 1 is communicated to the external circulating water inlet 36 through a check valve and a first refrigeration device 2 successively.

The cold and hot pipe outlet 34 is communicated to a water inlet of a second water storage tank 10 through a check valve; a water outlet of the second water storage tank 10 is communicated to a second filter 12 and a second pump body 13 successively; the second pump body 13 is communicated to an inlet of a hot steam generator 4 and an input port of a second refrigeration device 5 respectively through valves; a steam output port of the hot steam generator 4 is communicated to a first input port of a three-way valve 16 through a check valve; an output port of the second refrigeration device 5 is communicated to a second input port of the three-way valve 16 through a check valve; and an output port of the three-way valve 16 is communicated to an outer end of the cold and hot pipe inlet 39.

The cabinet body 3 includes a cabinet body shell 318 and a cabinet door 33; the top of the cabinet body 3 is provided with a weighing device 35; the weighing device 35 is connected with a weighing bracket 314 arranged in the cabinet body 3 through a tension column 316; a plurality of groups of supporting holders 313 are arranged on the weighing bracket 314 along a vertical direction; a slotted hole drawer 32 for holding sea cucumbers is arranged on each group of the supporting holder 313 in a supported manner; and a circulating water passing hole is formed in the slotted hole drawer 32.

An inner end of the cold and hot pipe inlet 39 is communicated with a vertical cold and hot pipe input pipeline 321 arranged inside the cabinet body 3; and an inner end of the cold and hot pipe outlet 34 is communicated with a vertical cold and hot pipe output pipeline 320 arranged inside the cabinet body 3.

A cold and hot plate structure 319 formed by coiling a cold and hot pipe is arranged below each group of the supporting holder 313; a gas-liquid input port of each cold and hot plate structure 319 is communicated to the cold and hot pipe input pipeline 321; and a gas-liquid output port of each cold and hot plate structure 319 is communicated to the cold and hot pipe output pipeline 320.

An internal circulating water outlet is formed in a bottom side wall of the cabinet body shell 318; an internal circulating water inlet is formed in a top side wall of the cabinet body shell 318; a bottom end of an internal circulating pipeline 312 arranged outside the cabinet body 3 is connected to the internal circulating water outlet; a top end of the internal circulating pipeline 312 is connected to the internal circulating water inlet; internal circulating filtering screens 310 are arranged at both the internal circulating water inlet and the internal circulating water outlet; an internal circulating water pump 311 is arranged on the internal circulating pipeline 312.

An upper part and a lower part in the cabinet body 3 are both provided with a temperature sensor 317.

Optionally, a branch branched out between the first throttling valve 11 and the first pump body 8 is communicated back to the water inlet of the first water storage tank 6 through a first overflow valve 9.

Optionally, a branch branched out from the output port of the three-way valve 16 is communicated back to the water inlet of the second water storage tank 10 through a second overflow valve 14.

Optionally, the cabinet door 33 is rotatably arranged on the cabinet body shell 318 through a movable hinge 37.

Optionally, an observation opening is formed in the cabinet door 33, and a piece of transparent glass 38 is arranged at the observation opening.

Optionally, the weighing device 35 includes a dial plate 315 arranged outside the cabinet body 3.

Optionally, a front end of the slotted hole drawer 32 is provided with a handle.

The disclosure has the beneficial effects that:

1. A temperature control function: In a sea cucumber soaking process, the soaking effect is best at 2-8° C. This system can adjust the temperature of water in the cabinet body through a refrigeration system, so that the sea cucumbers can be kept in the best soaking condition.

2. A weighing function: In the sea cucumber soaking process, a soaking state of the sea cucumbers needs to be learned, and it is mainly measured by weight. This system can directly weigh the weight of the sea cucumbers through the weighing device after water in the cabinet body is emptied, and a multiple of the soaking of the sea cucumbers is directly obtained.

3. A water saving function: The sea cucumber soaking process requires a large amount of water. After the sea cucumbers are soaked for 1-2 times, water for soaking the sea cucumbers is usually clean, so that the water that has been used for soaking the sea cucumbers can be used for at least 2 times through a water purification system of external circulation (including the first filter and the main filter), thus achieving the effect of saving resources.

4. An automatic soaking function: After the cooked sea cucumbers are put into the cabinet body and are weighed once, a sea cucumber soaking multiple can be set, such as 3 times. A water changing interval is 6-12 h. If the sea cucumbers are 10 kg, after each time of water changing, the system automatically records the weight of the sea cucumbers. After the sea cucumbers reach 30 kg, the system can automatically prompt that soaking is completed.

5. A cooking function: By the use of the system of the disclosure, the sea cucumbers can be cooked at the same time. Furthermore, cooking and soaking can be freely switched, so that the system of the disclosure can be used to integrate the cooking process and the soaking process to one production flow to achieve seamless connection, and the sea cucumber processing efficiency is improved.

BRIEF DESCRIPTION OF FIGURES

In order to explain the technical solutions of the examples of the disclosure more clearly, the following will briefly introduce the accompanying drawings used in the description of the examples. Apparently, the drawings in the following description are only some examples of the disclosure. Those of ordinary skill in the art can obtain other drawings based on these drawings without creative work.

In the drawings: 1: main filter; 2: first refrigeration device; 3: cabinet body; 4: hot steam generator; 5: second refrigeration device; 6: first water storage tank; 7: first filter; 8: first pump body; 9: first overflow valve; 10: second water storage tank; 11: first throttling valve; 12: second filter; 13: second pump body; 14: second overflow valve; 15: second throttling valve; 16: three-way valve;

31: external circulating water outlet; 32: slotted hole drawer; 33: cabinet door; 34: cold and hot pipe outlet; 35: weighing device; 36: external circulating water inlet; 37: movable hinge; 38: transparent glass; 39: cold and hot pipe inlet; 310: internal circulating filtering screen; 311: internal circulating water pump; 312: internal circulating pipeline; 313: supporting holder; 314: weighing bracket; 315: dial plate; 316: tension column; 317: temperature sensor; 318: cabinet body shell; 319: cold and hot plate structure; 320: cold and hot pipe output pipeline; and 321: cold and hot pipe input pipeline.

DETAILED DESCRIPTION

In order to make the objectives, the technical solutions and the advantages of the disclosure clearer, detailed description will be made to the implementation modes of the disclosure below in combination with the accompanying drawings.

Example 1

Figure 1:
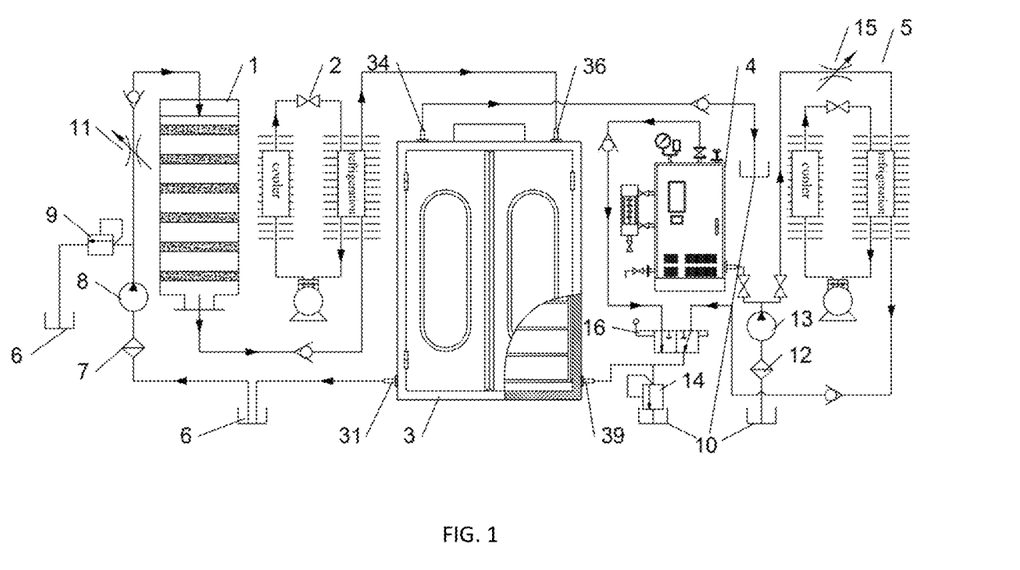
FIG. 1 is a schematic diagram of constitution of a system according to the disclosure.

This example provides an integrated automatic sea cucumber cooking and soaking system. Referring to FIG. 1, the system includes:

a cabinet body 3 for holding sea cucumbers. An external circulating water inlet 36 and a cold and hot pipe outlet 34 are formed in a top of the cabinet body 3; an external circulating water outlet 31 and a cold and hot pipe inlet 39 are formed in a bottom side wall of the cabinet body 3; and both the external circulating water inlet 36 and the external circulating water outlet 31 are provided with a valve.

The external circulating water outlet 31 is communicated to a water inlet of a first water storage tank 6; and a water outlet of the first water storage tank 6 is communicated to an inlet of a main filter 1 through a first filter 7, a first pump body 8, a first throttling valve 11 and a check valve successively.

An outlet of the main filter 1 is communicated to the external circulating water inlet 36 through a check valve and a first refrigeration device 2 successively.

The cold and hot pipe outlet 34 is communicated to a water inlet of a second water storage tank 10 through a check valve; a water outlet of the second water storage tank 10 is communicated to a second filter 12 and a second pump body 13 successively; the second pump body 13 is communicated to an inlet of a hot steam generator 4 and an input port of a second refrigeration device 5 respectively through valves; a steam output port of the hot steam generator 4 is communicated to a first input port of a three-way valve 16 through a check valve; an output port of the second refrigeration device 5 is communicated to a second input port of the three-way valve 16 through a check valve; and an output port of the three-way valve 16 is communicated to an outer end of the cold and hot pipe inlet 39.

Figure 2:
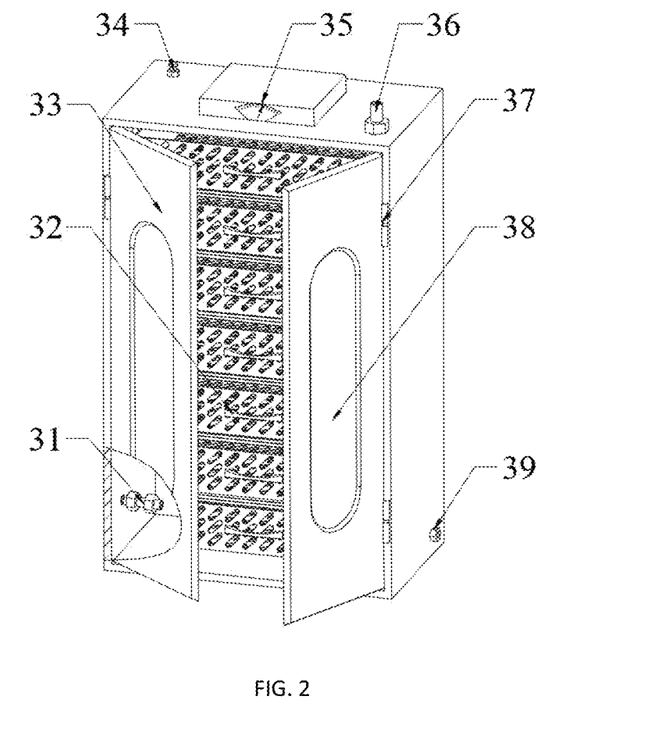
FIG. 2 is a schematic structural diagram of a cabinet body of the system according to the disclosure.
Figure 3:
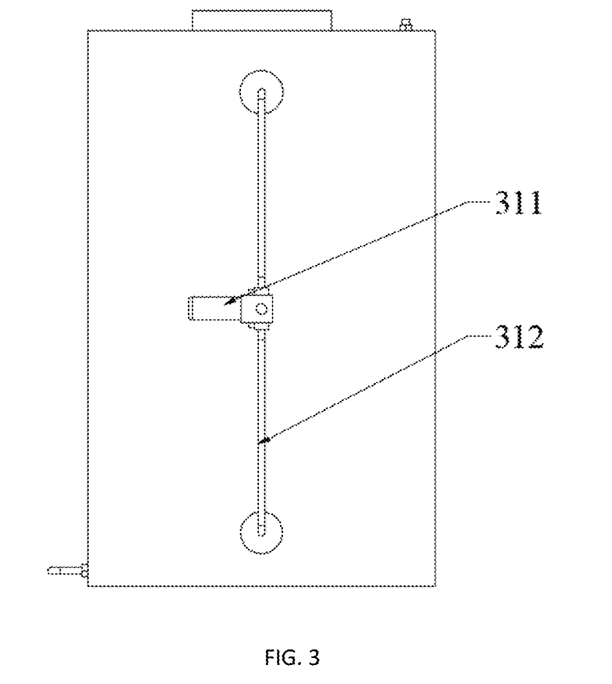
FIG. 3 is a rear view of the cabinet body of the system according to the disclosure.
Figure 4:
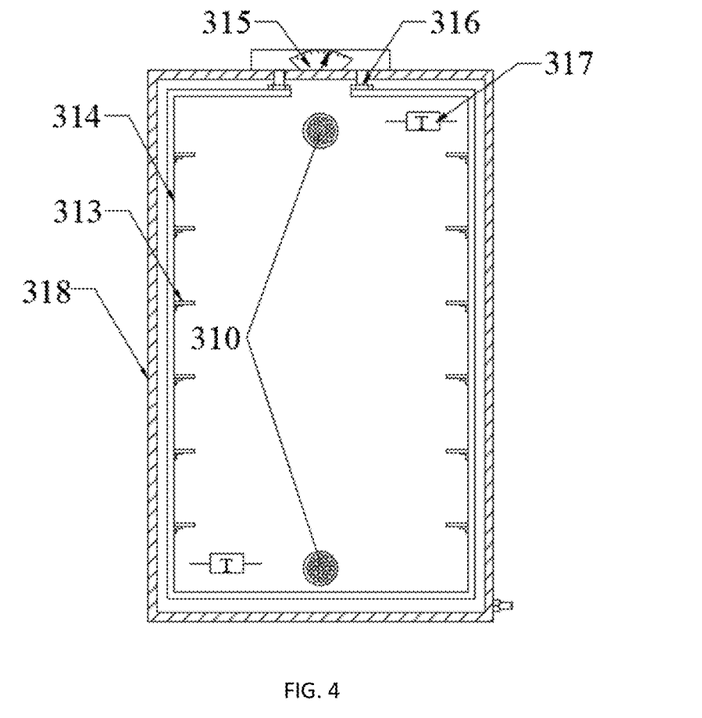
FIG. 4 is a vertical sectional view of the cabinet body of the system according to the disclosure.

As shown in FIG. 2, FIG. 3 and FIG. 4, the cabinet body 3 includes a cabinet body shell 318 and a cabinet door 33; the top of the cabinet body 3 is provided with a weighing device 35; the weighing device 35 is connected with a weighing bracket 314 arranged in the cabinet body 3 through a tension column 316; a plurality of groups of supporting holders 313 are arranged on the weighing bracket 314 along a vertical direction; a slotted hole drawer 32 for holding sea cucumbers is arranged on each group of the supporting holder 313 in a supported manner; a circulating water passing hole is formed in the slotted hole drawer 32; and the slotted hole drawer 32 is a component that can be pulled out independently.

Figure 5:
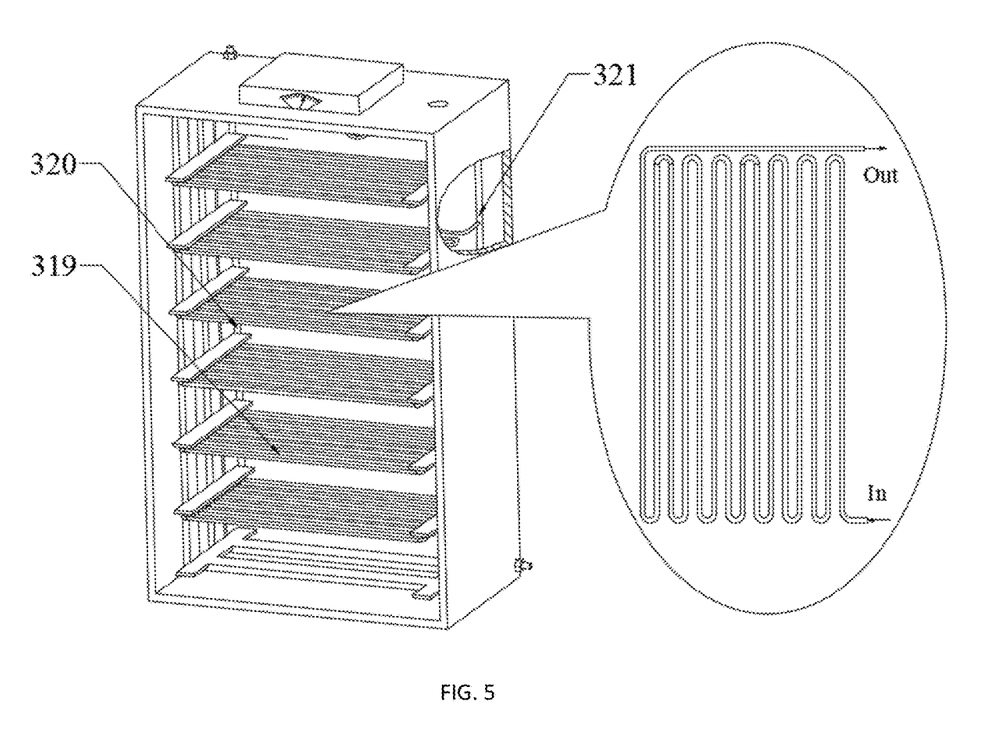
FIG. 5 is a schematic diagram of arrangement of a cold and hot pipe of the cabinet body of the system according to the disclosure.
Figure 6:
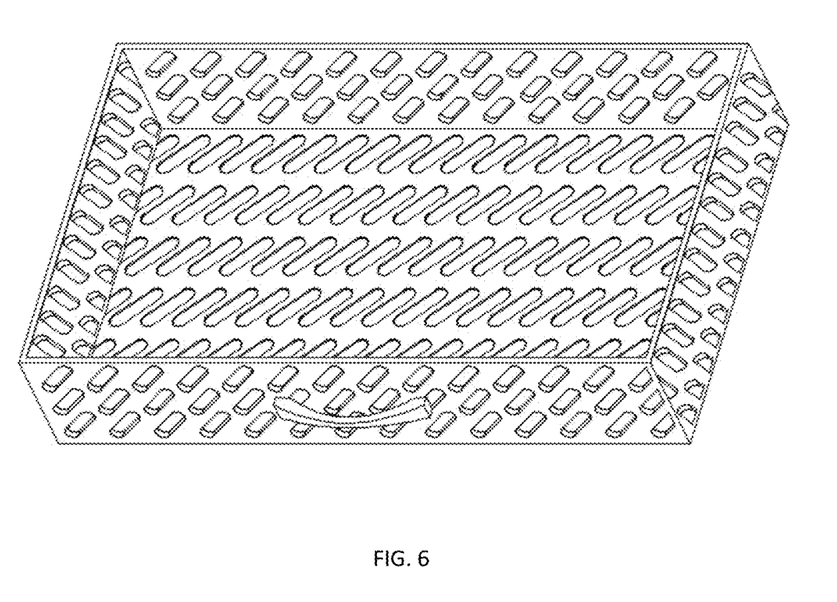
FIG. 6 is a schematic diagram of a slotted hole drawer according to the disclosure.

As shown in FIG. 5, an inner end of the cold and hot pipe inlet 39 is connected to a vertical cold and hot pipe input pipeline 321 arranged inside the cabinet body 3; an inner end of the cold and hot pipe outlet 34 is connected to a vertical cold and hot pipe output pipeline 320 arranged inside the cabinet body 3; a cold and hot plate structure 319 formed by coiling a cold and hot pipe is arranged below each group of the supporting holder 313; a gas-liquid input port of each cold and hot plate structure 319 is communicated to the cold and hot pipe input pipeline 321; a gas-liquid output port of each cold and hot plate structure 319 is communicated to the cold and hot pipe output pipeline 320; the cold and hot pipe input pipeline 321 is communicated with the cold and hot pipe output pipeline 320 through the cold and hot plate structures 319; and water enters the cold and hot plate structure formed by coiling the cold and hot pipe from the cold and hot pipe inlet 39 through the cold and hot pipe input pipeline 321, and then flows out from the cold and hot pipe outlet 34 through the cold and hot pipe output pipeline 320.

The cold and hot pipe input pipeline 321 and the cold and hot pipe output pipeline 320 can be arranged at two sides of the interior of the cabinet body 3.

As shown in FIG. 3 and FIG. 4, an internal circulating water outlet is formed in a bottom side wall of the cabinet body shell 318; an internal circulating water inlet is formed in a top side wall of the cabinet body shell 318; a bottom end of an internal circulating pipeline 312 arranged outside the cabinet body 3 is connected to the internal circulating water outlet; a top end of the internal circulating pipeline 312 is connected to the internal circulating water inlet; internal circulating filtering screens 310 are arranged at both the internal circulating water inlet and the internal circulating water outlet; an internal circulating water pump 311 is arranged on the internal circulating pipeline 312; and an upper part and a lower part in the cabinet body 3 are both provided with a temperature sensor 317.

The internal circulating water outlet and the internal circulating water inlet can be arranged in side walls at two sides and a rear side wall of the cabinet body shell 318. Referring to FIG. 3 and FIG. 4, in this example, the internal circulating water outlet and the internal circulating water inlet are arranged in the rear side wall of the cabinet body shell 318. A branch branched out between the first throttling valve 11 and the first pump body 8 is communicated back to the water inlet of the first water storage tank 6 through a first overflow valve 9. A branch branched out from the output port of the three-way valve 16 is communicated back to the water inlet of the second water storage tank 10 through a second overflow valve 14.

The cabinet door 33 is rotatably arranged on the cabinet body shell 318 through a movable hinge 37.

An observation opening is formed in the cabinet door 33, and a piece of transparent glass 38 is arranged at the observation opening.

The weighing device 35 includes a dial plate 315 arranged outside the cabinet body 3.

A front end of the slotted hole drawer 32 is provided with a handle.

In the above-mentioned integrated automatic sea cucumber cooking and soaking system, the external circulating water inlet 36, the external circulating water outlet 31, the internal circulating water outlet, and the internal circulating water inlet in the cabinet body 3 are all used for achieving flowing of water in the cabinet body 3. The internal circulating water outlet and the internal circulating water inlet are used for achieving flowing of the water in the cabinet body 3 through the inner circulating pipeline 312; and the external circulating water inlet 36 and the external circulating water outlet 31 achieve flowing of the water in the cabinet body 3 through the main filter 1 and the first refrigeration device 2. The cold and hot pipe inlet 39 and the cold and hot pipe outlet 34 are used for achieving flowing of the water that flows through the cold and hot pipe input pipeline 321, the cold and hot plate structures 319 and the cold and hot pipe output pipeline 320, and flowing of the water is achieved through the hot steam generator 4 or the second refrigeration device 5.

The disclosure has both a sea cucumber cooking function and a sea cucumber soaking function. In an actual production process of sea cucumbers, the cooking process is conducted before the soaking process, so that a use process of the integrated automatic sea cucumber cooking and soaking system is as follows:

In the sea cucumber cooking process: Treated sea cucumbers are put into the slotted hole drawers 32; the cabinet body 3 is closed; normal-temperature pure water is added through the external circulating water inlet 36 (thus, the first refrigeration device 2 needs to be turned off); the valve at the external circulating water outlet 31 is closed; and the normal-temperature pure water can fill the entire cabinet body 3 after it passes through circulating water through holes in the plurality of slotted hole drawers 32 from top to bottom. At this time, the hot steam generator 4 is turned on; the three-way valve 16 is adjusted to the first input port so that hot steam enters the cold and hot pipe inlet 39; and the hot steam will enter the cold and hot plate structure 319 to heat the circulating water in the cabinet body 3 and is discharged back to the second water storage tank 10 from the cold and hot pipe outlet 34. Specific cooking time can be set according to the specification of the sea cucumbers. After the heating ends, the valve at the external circulating water outlet 31 is opened to completely discharge the water in the cabinet body 3. The sea cucumber soaking process is then carried out.

In the sea cucumber soaking process: After the cooking of the sea cucumbers is completed, the sea cucumbers do not need to be taken out. The sea cucumbers are weighed first. After a reading of the dial plate 315 on the weighing device 35 is read and recorded (the dial plate reading can be set to be net mass of the sea cucumbers, which is obtained by deducting the weights of the weighing bracket 314, the slotted hole drawers 32 and other components except for the sea cucumbers from the total weight), cooled external circulating water is directly injected through the external circulating water inlet 36 (at this time, the first refrigeration device 2 is in an on state). The valve at the external circulating water outlet 31 is closed to enable the external circulating water to fill the entire cabinet body 3. In the sea cucumber soaking process, the soaking effect is best at 2-8° C. Therefore, the temperature of the external circulating water can be set to be 2-8° C.

In the sea cucumber soaking process, the external circulating water that stands for a long time may become hot due to the high temperature of the sea cucumbers that have just been cooked. Therefore, if any temperature sensor 317 finds that the temperature is higher than a preset temperature threshold (for example, the temperature threshold can be set to 8° C.), the second pump body 13 is turned on; the three-way valve 16 is adjusted to the second input port to inject cooling water cooled by the second refrigeration device 5; the cooling water enters the cold and hot plate structure 319 through the cold and hot pipe inlet 39. Furthermore, in this process, the internal circulating water pump 311 is turned on to continuously introduce the circulating water in the lower part of the cabinet body 3 to the top of the cabinet body 3 through the internal circulating pipeline 312, so that the temperature of the circulating water is approximately uniform at each region in the cabinet body 3. If any temperature sensor 317 finds that the temperature of the circulating water is lower than 2° C., the second pump body 13 is turned off to stop cooling the circulating water.

After one soaking cycle (which can be set to be 6-12 h), the circulating water needs to be filtered or changed. At this time, the valve of the external circulating water outlet 31 is opened; and the first pump body 8 is turned on to discharge all the circulating water in the cabinet body 3. After the circulating water is filtered by the first filter 7 to remove larger particles from the circulating water, the circulating water is more finely filtered through the main filter 1 (a plurality of layers of filter cakes for fine filtration are arranged in the main filter 1), is then refrigerated through the first refrigeration device 2, and is injected back into the cabinet body 3 through the external circulating water inlet 36. The soaking process of the above cycle is repeated.

After another cycle, if it is found that the circulating water can still meet the standard after being filtered, the filtered circulating water can still be used for the next cycle of soaking; and if it is found that the filtered circulating water cannot meet the standard, clean circulating water is used for replacement for the next cycle of soaking.

It should be noted that whether the circulating water meets the standard can be determined by a Total Dissolved Solids (TDS) water quality detector arranged at the external circulating water outlet 31. In this example, a TDS value can be set to be less than 50 mg/L, which indicates that the circulating water meets the standard.

At the end of each soaking cycle, the sea cucumbers in the cabinet with the circulating water being discharged need to be weighed. If the weight of the sea cucumbers reaches the set multiple (such as 3 times) of the original weight, the soaking process ends, and the sea cucumbers can be taken out directly.

In the disclosure, two overflow valves are also provided. Through the overflow valves, the circulating water or cooling water can be conveyed back to the water storage tank when the pressure in the pipeline is too high.

In the disclosure, the temperature sensor 317, the weighing device 35, the first refrigeration device 2, the second refrigeration device 5, the water pumps, the valves of all the pipelines and the like can be connected to a control system for unified control, so the above control process can be fully automatic, and setting of parameters, reading of data and opening and closing of the valves can also be manually implemented. In manual implementation, a temperature display part for temperature data of the temperature sensor 317 can be arranged outside the cabinet body 3 for manual read.

Some steps in the example of the disclosure may be implemented by software, and corresponding software programs may be stored in a readable storage medium, such as an optical disk or a hard disk.

The above descriptions are only preferred examples of the disclosure, and are not intended to limit the disclosure. Any modifications, equivalent replacements and improvements that are made within the spirit and principle of the disclosure shall fall within the protection scope of the disclosure.

What is claimed is:

1. An integrated automatic sea cucumber cooking and soaking system, comprising a cabinet body (3) for holding sea cucumbers, wherein an external circulating water inlet (36) and a cold and hot pipe outlet (34) are formed in a top of the cabinet body (3); an external circulating water outlet (31) and a cold and hot pipe inlet (39) are formed in a bottom side wall of the cabinet body (3); both the external circulating water inlet (36) and the external circulating water outlet (31) are provided with a valve;

the external circulating water outlet (31) is communicated to a water inlet of a first water storage tank (6); a water outlet of the first water storage tank (6) is communicated to an inlet of a main filter (1) through a first filter (7), a first pump body (8), a first throttling valve (11) and a check valve successively;

an outlet of the main filter (1) is communicated to the external circulating water inlet (36) through a check valve and a first refrigeration device (2) successively;

the cold and hot pipe outlet (34) is communicated to a water inlet of a second water storage tank (10) through a check valve; a water outlet of the second water storage tank (10) is communicated to a second filter (12) and a second pump body (13) successively; the second pump body (13) is communicated to an inlet of a hot steam generator (4) and an input port of a second refrigeration device (5) respectively through valves; a steam output port of the hot steam generator (4) is communicated to a first input port of a three-way valve (16) through a check valve; an output port of the second refrigeration device (5) is communicated to a second input port of the three-way valve (16) through a check valve; an output port of the three-way valve (16) is communicated to an outer end of the cold and hot pipe inlet (39);

the cabinet body (3) comprises a cabinet body shell (318) and a cabinet door (33); the top of the cabinet body (3) is provided with a weighing device (35); the weighing device (35) is connected with a weighing bracket (314) arranged in the cabinet body (3) through a tension column (316); a plurality of groups of supporting holders (313) are arranged on the weighing bracket (314) along a vertical direction; a slotted hole drawer (32) for holding sea cucumbers is arranged on each group of the supporting holder (313) in a supported manner; a circulating water passing hole is formed in the slotted hole drawer (32);

an inner end of the cold and hot pipe inlet (39) is communicated with a vertical cold and hot pipe input pipeline (321) arranged inside the cabinet body (3); an inner end of the cold and hot pipe outlet (34) is communicated with a vertical cold and hot pipe output pipeline (320) arranged inside the cabinet body (3);

a cold and hot plate structure (319) formed by coiling a cold and hot pipe is arranged below each group of the supporting holder (313); a gas-liquid input port of each cold and hot plate structure (319) is communicated to the cold and hot pipe input pipeline (321); a gas-liquid output port of each cold and hot plate structure (319) is communicated to the cold and hot pipe output pipeline (320);

an internal circulating water outlet is formed in a bottom side wall of the cabinet body shell (318); an internal circulating water inlet is formed in a top side wall of the cabinet body shell (318); a bottom end of an internal circulating pipeline (312) arranged outside the cabinet body (3) is connected to the internal circulating water outlet; a top end of the internal circulating pipeline (312) is connected to the internal circulating water inlet; internal circulating filtering screens (310) are arranged at both the internal circulating water inlet and the internal circulating water outlet; an internal circulating water pump (311) is arranged on the internal circulating pipeline (312); and an upper part and a lower part in the cabinet body (3) are both provided with a temperature sensor (317).

2. The integrated automatic sea cucumber cooking and soaking system according to claim 1, wherein a branch branched out between the first throttling valve (11) and the first pump body (8) is communicated back to the water inlet of the first water storage tank (6) through a first overflow valve (9).

3. The integrated automatic sea cucumber cooking and soaking system according to claim 1, wherein a branch branched out from the output port of the three-way valve (16) is communicated back to the water inlet of the second water storage tank (10) through a second overflow valve (14).

4. The integrated automatic sea cucumber cooking and soaking system according to claim 1, wherein the cabinet door (33) is rotatably arranged on the cabinet body shell (318) through a movable hinge (37).

5. The integrated automatic sea cucumber cooking and soaking system according to claim 1, wherein an observation opening is formed in the cabinet door (33), and a piece of transparent glass (38) is arranged at the observation opening.

6. The integrated automatic sea cucumber cooking and soaking system according to claim 1, wherein the weighing device (35) comprises a dial plate (315) arranged outside the cabinet body (3).

7. The integrated automatic sea cucumber cooking and soaking system according to claim 1, wherein a front end of the slotted hole drawer (32) is provided with a handle.

* * * * *